United States Patent
Nishimura et al.

(10) Patent No.: US 9,856,396 B2
(45) Date of Patent: Jan. 2, 2018

(54) SURFACE ORNAMENT COMPOSITION FOR PART OF FISHING TACKLE OR BICYCLE

(75) Inventors: Yasushi Nishimura, Sakai (JP);
Hiroyuki Arimoto, Tsuyama (JP);
Kazumi Yasuda, Tsuyama (JP);
Yasukazu Kawamoto, Tsuyama (JP)

(73) Assignee: Shimano Inc., Sakai, Osaka (JP)

( * ) Notice: Subject to any disclaimer, the term of this patent is extended or adjusted under 35 U.S.C. 154(b) by 594 days.

(21) Appl. No.: 14/116,748

(22) PCT Filed: May 9, 2012

(86) PCT No.: PCT/JP2012/061912
§ 371 (c)(1),
(2), (4) Date: Feb. 6, 2014

(87) PCT Pub. No.: WO2012/153778
PCT Pub. Date: Nov. 15, 2012

(65) Prior Publication Data
US 2014/0178676 A1    Jun. 26, 2014

(30) Foreign Application Priority Data
May 10, 2011 (JP) .................. 2011-105052

(51) Int. Cl.
*B32B 9/04* (2006.01)
*C09D 175/04* (2006.01)
(Continued)

(52) U.S. Cl.
CPC ............ *C09D 175/04* (2013.01); *A01K 87/00* (2013.01); *A01K 89/00* (2013.01); *B62K 19/16* (2013.01);
(Continued)

(58) Field of Classification Search
None
See application file for complete search history.

(56) References Cited

U.S. PATENT DOCUMENTS 6,088,947 A * 7/2000 Suzue .................... A01K 87/00
280/819

FOREIGN PATENT DOCUMENTS

EP        1834973 A1 *  9/2007
JP        11-269656 A    10/1999
(Continued)

OTHER PUBLICATIONS

Kato, JP2009-249671 machine translation, Oct. 29, 2009.*
Tanaka et al., JP 11-269656 machine translation, Oct. 5, 1999.*

*Primary Examiner* — Coris Fung
(74) *Attorney, Agent, or Firm* — Jeffer Mangels; Butler & Mitchell LLP; Brennan C. Swain, Esq.

(57) ABSTRACT

A surface ornament composition for fishing tackle or a bicycle is provided. An inner coating layer is laminated on a part made of fiber reinforced plastics, a silver thin film coating layer is laminated on the inner coating layer and an outer coating layer is laminated on the silver thin film coating layer. The inner and outer coating layers are formed by use of one selected from resin paint of two-part type formed by urethane reaction of isocyanate group and hydroxyl group, resin paint of two-part type formed by reaction of resin having amino group and silicon compound having epoxy group and resin paint of two-part or three part type in which the above two reactions are simultaneously generated. The silver thin film coating layer is formed of metal complex of silver with amine as ligand that is heated after having been applied.

4 Claims, 9 Drawing Sheets (51) Int. Cl.
    *A01K 87/00*     (2006.01)
    *A01K 89/00*     (2006.01)
    *C23C 18/08*     (2006.01)
    *C09D 163/00*     (2006.01)
    *C09D 175/16*     (2006.01)
    *B62K 19/16*     (2006.01)

(52) U.S. Cl.
    CPC ......... *C09D 163/00* (2013.01); *C09D 175/16* (2013.01); *C23C 18/08* (2013.01); *Y10T 428/265* (2015.01); *Y10T 428/31529* (2015.04); *Y10T 428/31605* (2015.04)

(56) References Cited

FOREIGN PATENT DOCUMENTS

| | | | |
|---|---|---|---|
| JP | 11-318279 | A | 11/1999 |
| JP | 2009-249671 | A | 10/2009 |
| JP | 2011-045335 | A | 3/2011 |

\* cited by examiner

Mixing Layer

FIG.6

SEM Photograph after Natural Drying 100,000 times 200,000 times 200,000 times

FIG.10

SURFACE ORNAMENT COMPOSITION FOR PART OF FISHING TACKLE OR BICYCLE

FIELD OF THE INVENTION

The present invention relates to a surface ornament composition for a part of a fishing tackle or a bicycle, in which coating is applied on the surface of a part or parts of a fishing tackle or a bicycle made of fiber reinforced plastics.

BACKGROUND OF THE INVENTION

As regards surface ornament composition for a part or parts of a fishing tackle or a bicycle, such techniques are conventionally used as follows.

(1) Techniques of metallic coating in which urethane resin paint or epoxy resin paint is sprayed or coated with a brush, thereafter baking and fixing are performed.

(2) Sophisticated coating techniques using vacuum vaporization, CVD, PVD or spattering of coating materials.

In techniques of (1), there may be some insufficiency in the feeling of vividness or hue of the coated surface. In techniques of (2), while rainbow coloring is possible by use of refraction of light and the feeling of hue may be in part satisfied, there are some factors making employment of it difficult because it necessitates an apparatus with a large scale and a manufacturing technique of a high level.

In this, consideration of forming a surface ornament composition by use of silver mirror reaction which exhibits a sufficient performance in ornamentation and can be performed with a relatively simple apparatus (see Japanese Patent Publication No. 2009-84596: Patent document 1, paragraphs [0032] to [00351]).

Figure 8A:
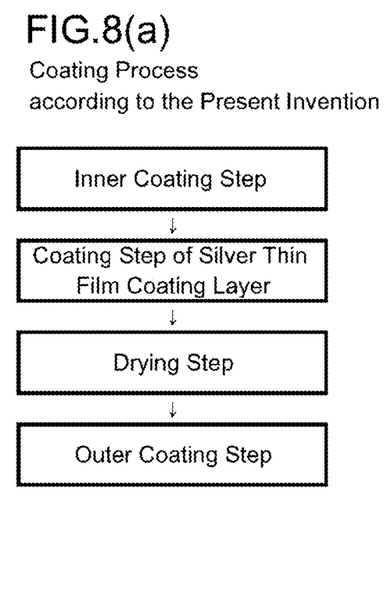
FIG. 8(a) is a diagram showing the process of coating silver thin film according to the present invention.
Figure 8B:
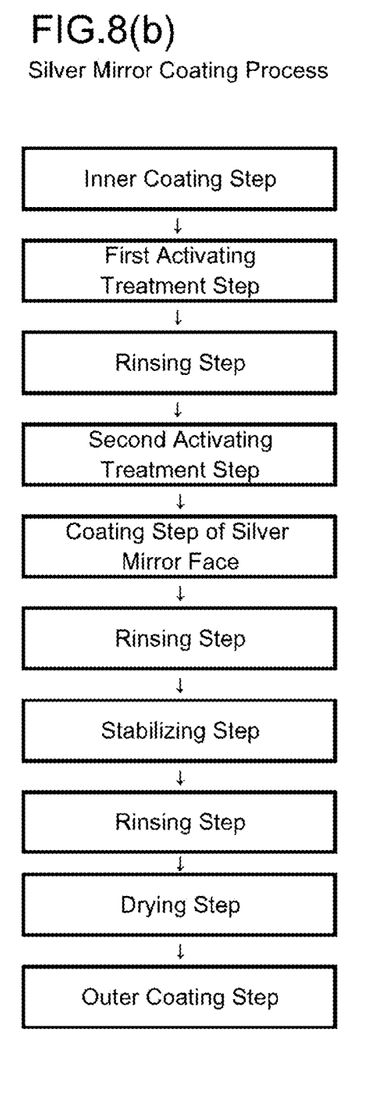
FIG. 8(b) is a diagram showing a silver mirror coating process.

However, the method using silver mirror reaction does not afford a product, which is sufficient in corrosion resistance and toughness strength, but gives a product that is inferior in mechanical strength. Yet, as seen in FIG. 8(*b*), most of processes for performing silver mirror coating involve a rinsing step after each step. Because of this, the manufacturing process is complicated and has much to be improved. Further, the process necessitates a special spraying means such as a coating gun of two-head type, causing a large expense for establishing the equipment to be inevitable.

SUMMARY OF THE INVENTION

It is an object of the present invention to provide a surface ornament composition for a part of a fishing tackle or a bicycle that is superior in the feeling of vividness or hue of the coated surface and has sufficient corrosion resistance and toughness, without necessitating use of an apparatus with a large scale.

According to a first aspect or a second aspect of the present invention, metal complex of silver with amine as ligand exhibits sufficient fluidity only by diluting with alcohol as explained later, therefore the coating step can be attained in a simple manner of spraying or painting with a brush. That is, as shown in FIG. 8(*a*), steps necessary for coating remain to be an inner coating step of forming an inner coating layer, a coating step of a silver thin film coating layer, a drying step and an outer coating step of forming an outer coating layer. Because a rinsing step is not necessary, the process of coating can be shortened and simplified. As to spraying means, a special gun as used in conventional silver mirror coating is not necessary. Consequently, burden for the equipment is not required so much.

Further, the silver face exhibits a face of high surface ornamentation in brightness, density, smoothness or the like compared with conventional metallic coating, because of melt bonding of deposited silver particles among themselves when heated.

On the other hand, when a metal complex of silver with amine as ligand is painted on the inner coating layer, amine in the metal complex of silver reacts with resin having not reacted yet in the inner coating layer (silicon compound having isocyanate group or epoxy group). Further, when paint for the outer coating layer is coated on the silver thin film coating layer formed by painting a metal complex of silver, amine remaining in the silver thin film coating layer reacts with the resin forming the outer coating layer. Owing to this, bonding strength between the silver thin film coating layer and the inner coating layer increases.

Consequently, in spite of a simple manner of operation without need of a large scale of equipment, delamination or corrosion is avoided in the boundary face between the silver thin film coating layer and the inner coating layer and a silver thin film coating layer can be formed that has high corrosion resistance and exhibits sufficient ornamentation.

According to a third aspect or a fourth aspect of the present invention, silver deposited from the metal complex of silver is in a form of nanoparticle. Consequently, melt bonding of silver particles is accomplished swiftly and tight silver thin film coating layer is formed, as will be explained later.

Further, as a bit of silver nanoparticles melt and a complete fixing in connection is not attained, a part of silver enters into the boundary region between the silver thin film coating layer and the outer coating layer so that, in the boundary region, the density of silver particles coexisting in the resin paint gradually increases as coming from the outer coating layer toward the silver thin film coating layer. Thus, an inclined mixing layer of silver with density increasing as coming toward the silver thin film coating layer and resin paint in the boundary region is formed. This allows tight adherence between the silver thin film coating layer and the outer coating layer to be improved, the aforementioned delamination to be restrained and corrosion resistance to be improved.

According to a fifth aspect or a sixth aspect of the present invention, the thickness of the silver thin film coating layer is preferably set to be in a range of 0.02 to 0.4 µm. It is more preferable to set the thickness to be in a range of 0.02 to 0.25 µm.

A wide range of 0.1 to 10 µm is recommended regarding the thickness of silver mirror film in Patent Document 1 cited as a conventional art. However, in the case where the thickness is more than 0.4 µm, cohesive failure occurs in the silver thin film coating layer under exfoliation test.

That is, a part disposed on the side of outer coating layer and a part disposed on the side of the inner coating layer in the silver thin film coating layer are separated, which causes exfoliation to occur easily at an intermediate position in the direction of thickness of the silver thin film coating layer.

According to a seventh aspect or eighth aspect of the present invention, between the silver thin film coating layer and the inner or outer coating layer, divisional line is not provided for a clear division of both areas but an inner or outer inclined mixing layer, in which silver particles are mixed within resin paint, is formed.

Consequently, even if a fishing rod or the like is deformed under external force, there is few possibility of exfoliation between the silver thin film coating layer and the inner or outer coating layer.

Further, as the ratio of silver mixed within resin paint is higher as nearer to the silver thin film coating layer in the inner or outer inclined mixing layer, stress is transferred smoothly from the silver thin film coating layer side to the inner or outer coating layer side so that absence of stress or the like can be prevented from occurring in such a portion.

DETAILED DESCRIPTION OF PREFERRED EMBODIMENTS

[First Embodiment]

Figure 1:
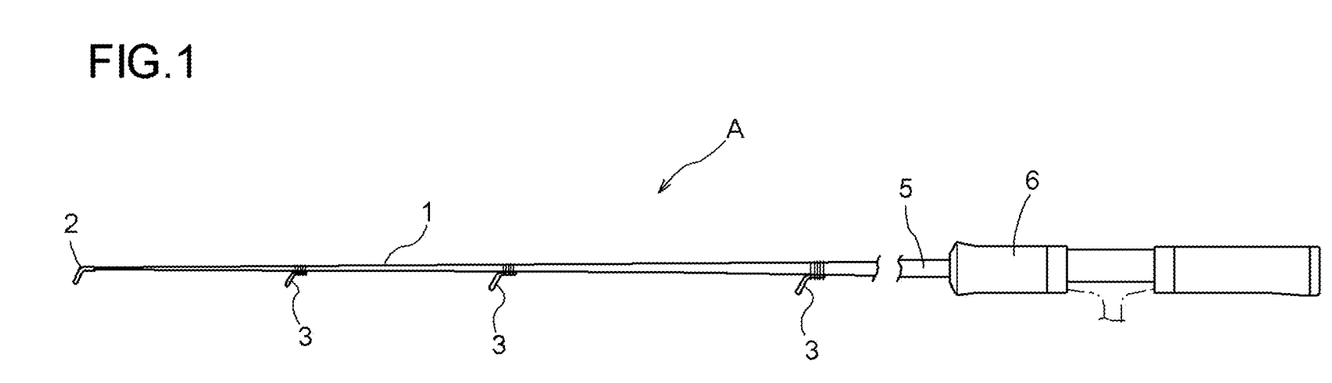
FIG. 1 is a side view showing a fishing rod.

Explanation will be made about a fishing rod A for fishing yamame (seema) or iwana (char). As shown in FIG. 1, a fishing rod A is composed so that a top guide 2 is attached to the tip end of a tip rod 1, guides 3 for a fishing line are attached to the intermediate position of the tip rod 1, a butt rod 5 is disposed so as to be connected to the base side with a normal joint and a reel seat 6 is attached to the butt rod 5 for mounting a spinning reel.

Here, the tip rod 1 and the butt rod 5 for composing the fishing rod A are fabricated as follows. First, reinforcing fibers such as carbon fibers are aligned in one direction and the group of the aligned reinforcing fibers is impregnated with thermosetting resin (or thermoplastic resin) to form a prepreg sheet. A plurality of the pattern sheets that are cut out from the prepreg sheet to have a substantially trapezoidal shape are wound around a mandrel, the rod material composed by winding a plurality of prepreg sheets around the mandrel is put into a furnace to bake it. After baking, the mandrel is removed to left the rod material. Then the rod material is cut to a desired length and working for finishing is performed to form a rod body.

As reinforcing fibers constituting a prepreg, carbon fibers or others such as glass fibers, aramid fibers or alumina fibers can be specifically used. As resins, epoxy resins or other thermosetting resins such as phenol resins or polyester or thermoplastic resins such as PV(E) can be used specifically. Further, prepregs may be composed by impregnating reinforcing fibers woven into cloth with a resin.

Figure 2A:
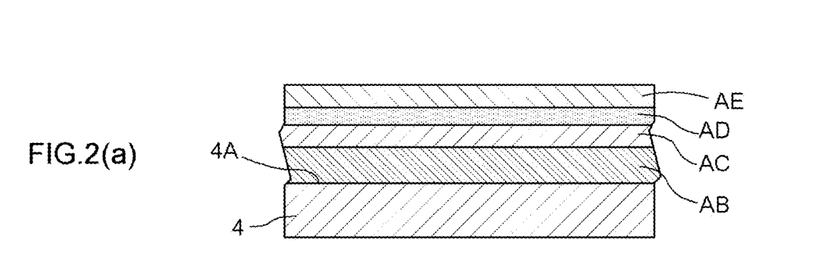
FIG. 2(a) is a lengthwise side sectional view showing a coating composition that has no a clear layer or the like on the outer side of the outer coating layer.
Figure 2B:
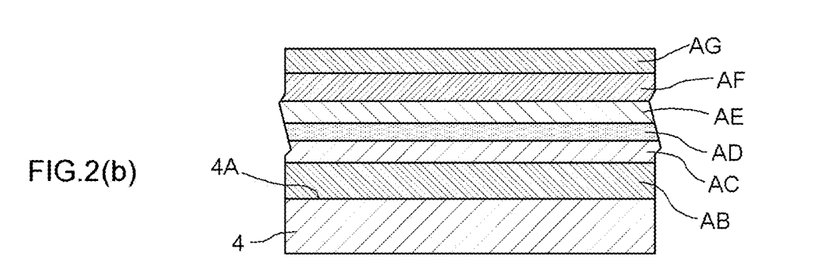
FIG. 2(b) is a lengthwise side sectional view showing a coating composition that has dual clear layers on the outer side of the outer coating layer.

Coating applied on the outer surface of an intermediate rod 4 or a butt rod 5 as a composing part of fishing rod A will be explained. Concerning the composition of coating, explanation will be made as to two cases, that is, a case in which the transparent clear layer explained later is not provided on the outside of the outer coating layer AE or clear paint is employed for the outer coating layer AE as shown in FIG. 2(a) and a case in which a colored clear layer AF and a clear transparent layer AG are provided on the outer coating layer AE as shown in FIG. 2(b). For example, that shown in FIG. 2(a) is used for an intermediate rod 4, etc. and that shown in FIG. 2(b) is used for a butt rod 5, etc. Here, such usage is not limited but can be selected freely.

As shown in FIG. 2(a), an innermost coating layer AB is provided on the surface of the outer peripheral face 4A of an intermediate rod 4, etc., an inner coating layer AC is provided on the innermost coating layer AB, a silver thin film coating layer AD is provided on the inner coating layer AC and an outer coating layer AE is provided on the silver thin film coating layer AD.

Similarly, as shown in FIG. 2(b), it can be selected whether an innermost coating layer AB is provided or not provided on the surface of the outer peripheral face 5A of a butt rod 5, etc. Here, in the case where an innermost coating layer AB is provided, an inner coating layer AC is provided on the innermost coating layer AB, a silver thin film coating layer AD is provided on the inner coating layer AC, an outer coating layer AE is provided on the silver thin film coating layer AD and further a colored clear layer AF and a transparent clear layer AG are formed on the outer coating layer AE in an overlapped manner.

Figure 2C:
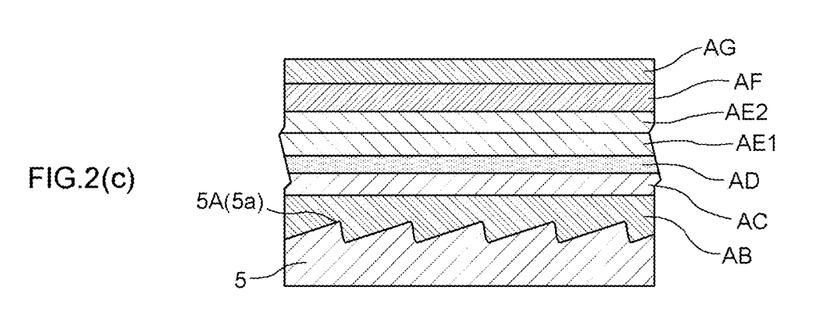
FIG. 2(c) is a lengthwise sectional view showing a coating composition in which the outer coating layer has a dual laminated coating composition of a first outer coating layer and a second outer coating layer.

Epoxy resin paint is selected for the innermost coating layer AB. This innermost coating layer AB covers the reinforcing fibers that may protrude on the rod surface of the intermediate rod 4, etc. and secures a tight contact of the inner coating layer AC. Further, as shown in FIG. 2(c), there is a case in which the butt rod 5, etc. is formed with molded traces 5a of tape wound spirally around the peripheral surface of the rod material left intentionally when the rod body is baked, though not shown. In order to smooth the molded traces 5a of tape, the innermost coating layer AB is formed.

In the next, the inner coating layer AC will be explained. The following four kinds are selected as resin paint used for the coating layer.

(1) First resin paint includes acryl-urethane resin paint of two-part type formed by urethane reaction of isocyanate group and hydroxyl group.

(2) Second resin paint includes acryl-silicon resin paint of two-part type formed by dehydration-dealcoholation condensation reaction of acryl resin having amino group and silicon compound having epoxy group.

(3) Third resin paint includes urethane modified acrylsilicon resin paint of two-part or three part type in which urethane reaction and dehydration-dealcoholation condensation reaction are simultaneously generated.

(4) Fourth resin paint includes epoxy resin paint having epoxy group.

One of the acryl-urethane resin paint and acryl-silicon resin paint, or both of acryl-urethane resin paint and acrylsilicon resin paint, and epoxy resin paint can be used for the aforementioned inner coating layer AC.

In applying these paints on the rod surface, it is preferable to perform baking in the baking furnace to make fixing after ironing painting, painting with a brush, spraying or the like has been performed.

Instead of acrylurethane resin paint, polyesterurethane resin paint, polycarbonateurethane resin paint or the like can be used. Further, instead of acrylsilicon resin paint, urethane modified acrylsilicon resin paint can be used.

In the next, the outer coating layer AE will be explained. The following three kinds are selected as resin paints used for the coating layer.

(1) First resin paint includes acrylurethane resin paint of two-part type formed by urethane reaction of isocyanate group and hydroxyl group.

(2) Second resin paint includes acrylsilicon resin paint of two-part type formed by dehydration-dealchoholation condensation reaction of acryl resin having amino group and silicon compound having epoxy resin.

(3) Third resin paint includes urethane modified acrylsilicon resin paint of two-part or three-part type in which urethane reaction and dehydration-dealcoholation condensation reaction are simultaneously generated.

One of the acrylurethane resin paint and acrylsilicon resin paint, or both of acryl-urethane resin paint and acryl-silicon resin paint can be used as paint for the aforementioned inner coating layer AC and outer coating layer AE.

In applying these paints on the rod surface, it is preferable to perform baking in the baking furnace to make fixing after ironing painting, painting with a brush, spraying or the like has been performed.

Instead of acrylurethane resin paint, polyesterurethane resin paint, polycarbonateurethane resin paint or the like can be used. Further, instead of acrylsilicon resin paint, urethane modified acrylsilicon resin paint can be used.

Here, as mentioned above, colored clear paint may be used instead of acrylurethane resin paint or the like for the outer coating layer AE employed in a intermediate rod 4.

The silver thin film coating layer AD will be explained. Here, the silver thin film coating layer AD is formed by painting complex of silver with amine. The complex of silver with amine refers specifically to a complex consisting of silver and 2-ethylhexylamine combined therewith as a ligand.

In this, what is employed as amine may extend from ones having a simple composition such as methylamine, dimethylamine, trimethylamine, etc. to ones having a relatively complicated composition such as N,N-diisopropylethylamine, etc.

The silver thin film coating layer AD is formed through steps as follows.

(1) Solvent such as isopropylalchol or the like is added to complex of silver with amine to increase fluidity.

Figures 3A, 3B, 3C:
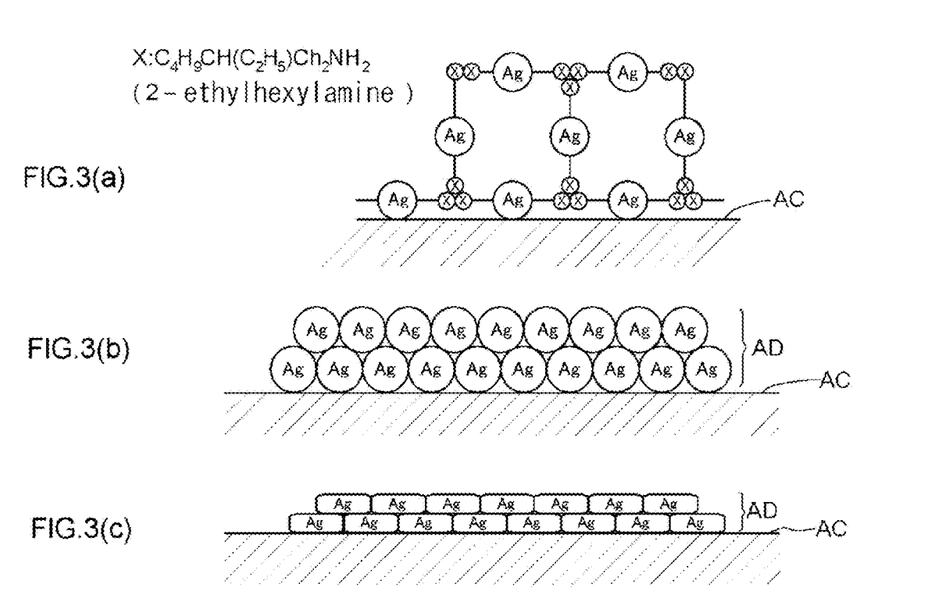
FIG. 3(a) is an explanatory view showing a state where silver-amine complex has been applied on the inner coating layer.
FIG. 3(b) is an explanatory view showing a state where amine departs from the silver-amine complex with heating and silver nanoparticles are deposited.
FIG. 3(c) is an explanatory view showing a state where deposited silver nanoparticles form a silver thin film through melt bonding.

(2) This fluidized complex of silver with amine is painted on the aforementioned inner coating layer AC. A coating method employed usually such as painting with a brush, spraying or the like is sufficient for the painting. FIG. 3(a) shows the state after painting has been done.

(3) In the next, this painted intermediate rod 4, etc. is baked in a baking furnace at a temperature of 100 to 170° C. for 10 to 60 minutes. Then, bonding strength between 2-ethylhexylamine as a ligand and silver is lowered along with evaporation of alcohol constituent so that the 2-ethylhexylamine departs from silver particles and, along with this, silver is reduced with reducing action by amine to cause nanoparticles of silver to be deposited. FIG. 3(b) shows this state.

Figure 6:
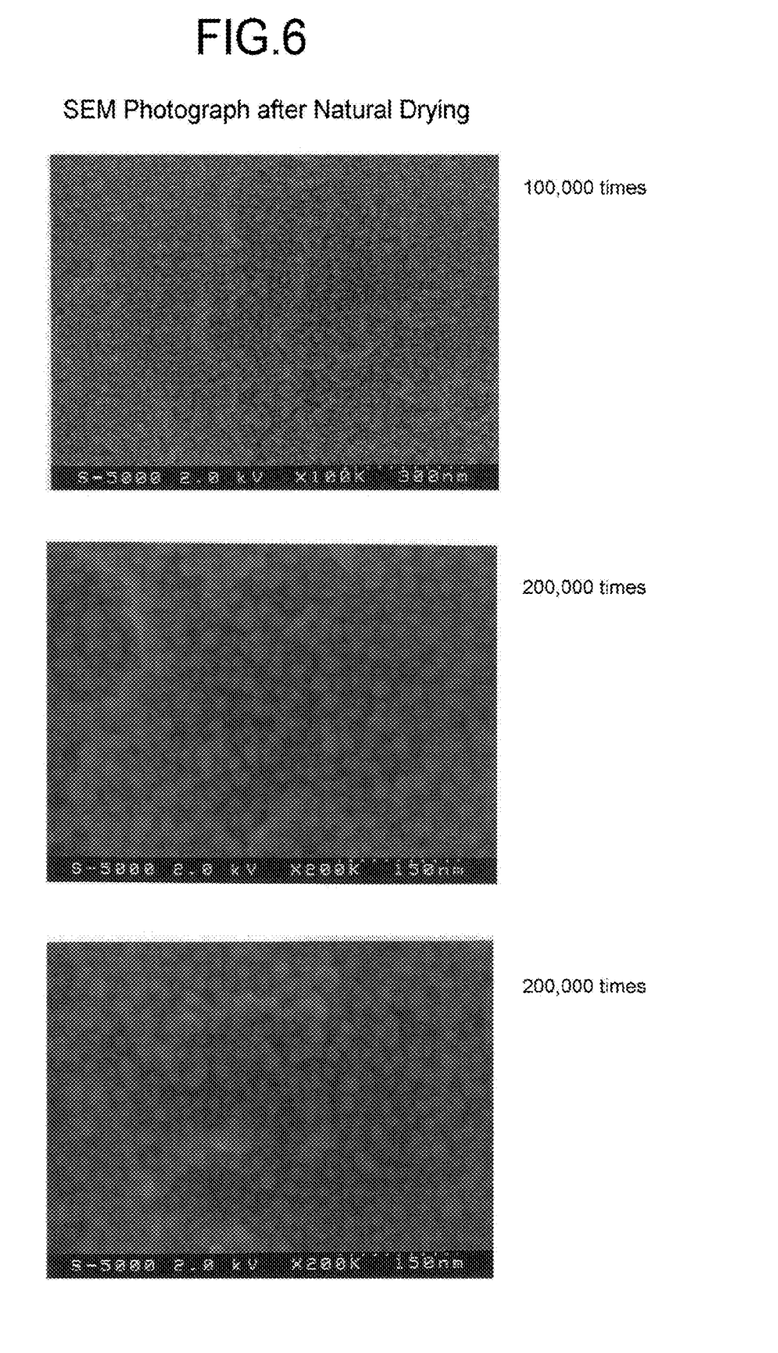
FIG. 6 is microscopic photographs of deposited silver nanoparticles corresponding to FIG. 3(c).

As shown in the microscopic photograph of FIG. 6, the size of the nanoparticles is about 15 to 20 nanometers.

(4) Groups of nanoparticles deposited on the inner coating layer AC in such a manner make partially melt bonding with melting-point depression to form the silver thin film coating layer AD, as shown in FIG. 3(c).

While the melting-point of silver is generally about 962° C., melting-point depression occurs in the above mentioned case as silver particles have a diameter in a nanometer level and, even though in a state of relatively gradual addition of baking heat at a temperature of 100° C., melting is promoted and melt bonding of deposited silver particles among themselves occurs to form silver thin film. Owing to such melting-point depression, there is no occasion for greenware bodies to be damaged.

Measurement of thickness of silver thin film coating layer AD formed in such a manner is performed.

Measurement of thickness is performed in the following procedures.

A scanning type apparatus of ESCA (Electron Spectroscopy for Chemical Analysis) is used for measurement. That is, spattering is performed by irradiating +argon particles emitted by an electron gun and elements are specified through spectroscopy of emitted elements. Along with this, film thickness is measured from the irradiated thickness.

Specimens to be measured are as follows.

Figure 7A:
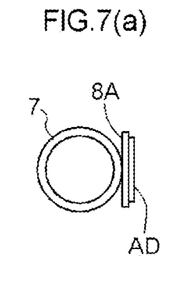
FIG. 7(a) is a left side view showing a state where a glass plate on which predetermined silver thin film coating is painted is attached to a rod body.
Figure 7B:
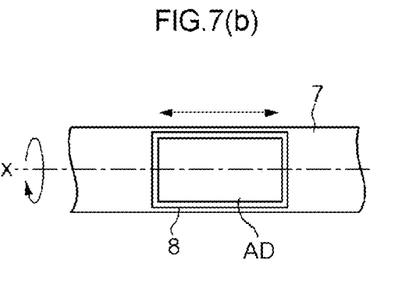
FIG. 7(b) is a front view corresponding to FIG. 7(a) and FIG. 7(c).

Two specimens (glass plate 1, glass plate 2) are prepared through forming a film corresponding to silver thin film coating layer AD on the surface of a glass plate 8A by way of spraying. One of the specimens is attached to the peripheral surface of a rod body 7 to be in its tangential direction, as shown in FIG. 7(a), (b).

Figure 7C:
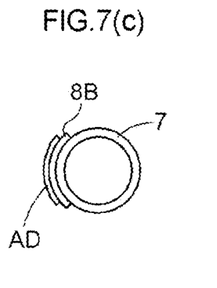
FIG. 7(c) is a right side view showing a state where a film on which predetermined silver thin film coating is painted is attached to a rod body.

The other specimen is one (film) in which three layers of an inner coating layer AC, a silver thin film coating layer AD and an outer coating layer AE are formed on the surface of a film 8B. In this case, the film 8B with the specimen is attached to the peripheral surface of a rod body 7 along its circular surface, not in the tangential direction, as shown in FIG. 7(c).

Measurement is performed reciprocally moving the rod body along the direction of the axis X while rotating the rod body 7 around the axis X.

The result of measurement was as shown in Table 1. Here, unit of thickness is nanometer.

TABLE 1

| Result of Measurement of Film Thickness (in nm) | | | |
| --- | --- | --- | --- |
| Sample | Glass Plate 1 | Glass Plate 2 | Film |
| Measured Value of Film Thickness | 84 | 90 | 261 |

Specimens supported on the glass plate or film are used for convenience of mounting on an apparatus of ESCA for measurement.

In the next, the innermost coating layer AB, the inner coating layer AC, the silver thin film coating layer AD and the outer coating layer AE are formed through the following steps.

That is, as shown in FIG. 8(a), a drying step is provided after forming the innermost coating layer AB, the inner coating layer AC and the silver thin film coating layer AD are formed. After completion of this drying step, the outer coating layer AE and the clear layer are formed. Thus, the steps of fabrication do not include a rinsing step that is involved in case of silver mirror reaction.

In the next, the manner of reaction in the inner inclined mixing layer ACD between the inner coating layer AC and the silver thin film coating layer AD and the manner of reaction in the outer inclined mixing layer ADE between the silver thin film coating layer AD and the outer coating layer AE will be explained.

In these inner inclined mixing layer ACD and outer inclined mixing layer ADE, inclined mixing layers are formed in which silver particles forming the silver thin film coating layer AD coexist with resin in the inner coating layer AC and the outer coating layer AE respectively. The mixing condition in the inclined mixing layers exhibits a manner of inclination in which ratio of silver particles becomes higher as nearer to the silver thin film coating layer AD. It is considered that the inclined mixing layer not only exhibits a physically mixed state of silver particles and resin in such a manner but also exhibits a chemically combined state in this inclined mixing layer as mentioned later.

A chemically combined state in the inner inclined mixing layer ACD will be explained.

(1) In a case where acrylurethane resin paint is used as the inner coating layer AC, urethane reaction of isocyanate group and hydroxyl group occurs as expressed by the following equation.

[Chemical Equation 1]

(2) In the next, isocyanate that has not reacted therein reacts with the amine in the silver thin film coating layer AD.

[Chemical Equation 2]

Here, a setting agent of glycigilsilan is used as a silicon compound. This reaction is considered to be one in which an amine in the silver thin film coating layer AD and an epoxy group in a silicon compound as a setting agent reacts.

[Chemical Equation 3]

The aforementioned primary amine or the like is created and present in the inner inclined mixing layer ACD.

A chemically combined state in the outer inclined mixing layer ADE will be explained.

(3) In the case where acrylurethane resin paint is used as the outer coating layer AE, isocyanate reacts with amine remaining in the silver thin film coating layer AD.

[Chemical Equation 4]

(4) In the case where acrylsilicon resin paint is used as the outer coating layer AE, setting agent of glycigilsilan is used as a silicon compound here. This reaction is considered to be one in which amine remaining in the silver thin film coating layer AD and epoxy group in the silicon compound react.

[Chemical Equation 5]

The aforementioned primary amine is created and present in the outer inclined mixing layer ADE.

Further, another reaction in the inner inclined mixing layer ACD and the outer inclined mixing layer ADE will be explained.

In the inner inclined mixing layer ACD between the inner coating layer AC and the silver thin film coating layer AD and in the outer inclined mixing layer ADE between the silver thin film coating layer AD and the outer coating layer AE, fixing state in connection of the silver thin film coating layer AD with the inner coating layer AC and fixing state in connection of the silver thin film coating layer AD with the outer coating layer AE are strengthened because of the following reaction other than the aforementioned reaction. That is,

[Chemical Equation 6]

As seen in the above equation of reaction, it is considered that the above hydrolysis occurs at the time of the setting reaction of the metal film in the silver thin film coating layer AD and acrylsilicon and the OH group separated at this time serves in hydrogen bond increasing tight bonding with metal.

Further, silver as metal coexists with resin paint in the inner inclined mixing layer ACD and the outer inclined mixing layer ADE. This strengthens fixing state in connection of the silver thin film coating layer AD with the inner coating layer AC and fixing state in connection of the silver thin film coating layer AD with the outer coating layer AE.

Figure 4:
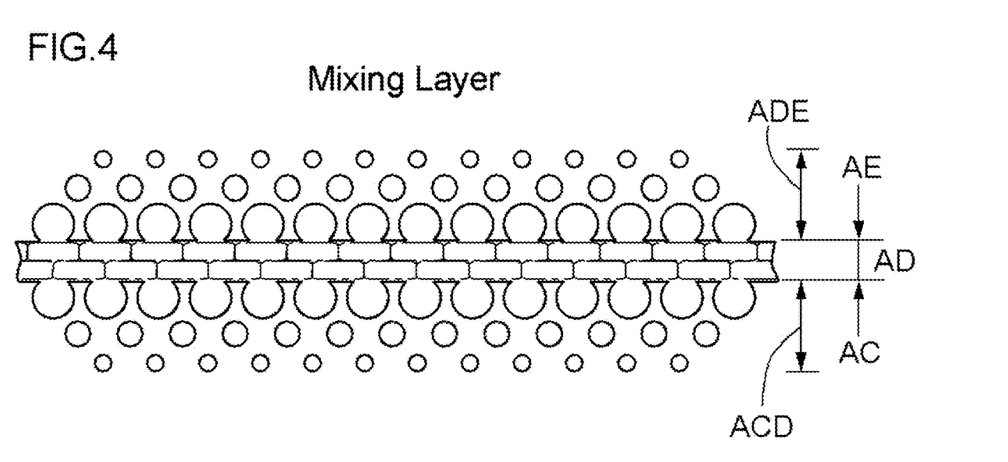
FIG. 4 is an explanatory view showing the mixing degree of silver in the inner inclined mixing layer between the inner coating layer and the silver thin film coating layer and in the outer inclined mixing layer between the outer coating layer and the silver thin film coating layer.

That is, all the raw silver is not baked to form silver mirror structure in the silver thin film coating layer AD, but part of the silver coexists with resin paint in the inner inclined mixing layer ACD and the outer inclined mixing layer ADE. Then, the ratio of coexisting silver is higher as nearer to the silver thin film coating layer AD, as shown in FIG. 4. That is, the state of inclination is such that the ratio of silver coexisting in the resin is higher as nearer to the silver thin film coating layer AD.

Figure 5:
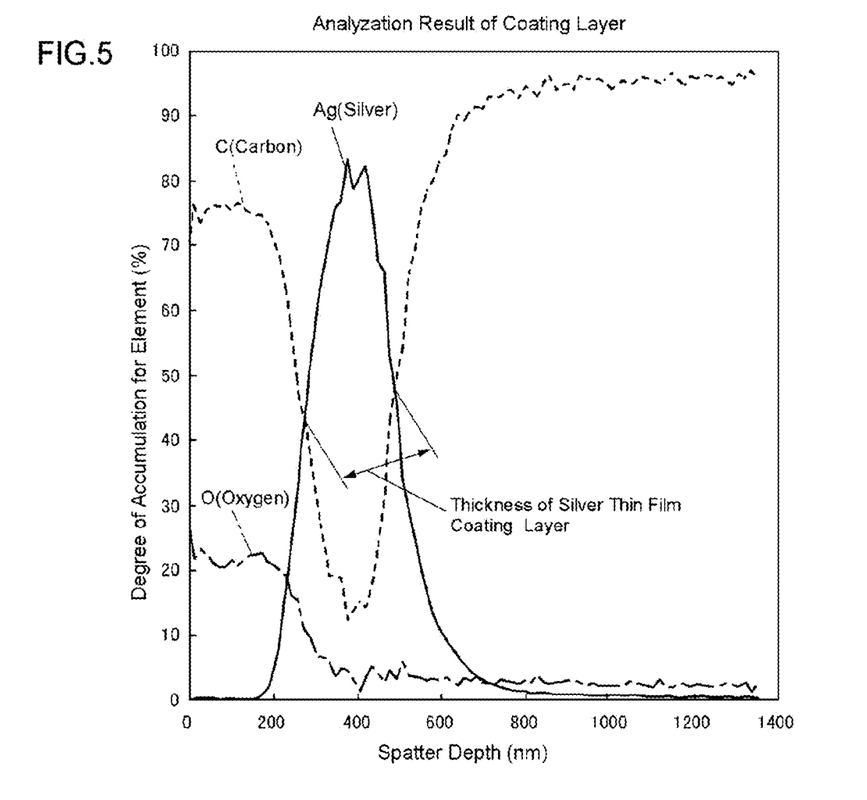
FIG. 5 is a graph showing the measured mixing ratio of silver and resin in the inner or outer inclined mixing layer.

This state of inclination can be calculated from the ratio of silver emitted from the coating layer to the resin paint, applying the aforementioned apparatus of ESCA to the film 8B with three layer composition prepared as a specimen. Obtained data are shown in FIG. 5.

In this, taking degree of accumulation (%) as the ordinate and spatter depth (nm) as the abscissa, it can be seen that ratio occupied by silver increases as nearer to the silver thin film coating layer AD. That is, it can be seen that a part corresponding to the outer coating layer AE exists so long as the spatter depth is 0 to about 200 nm and a part corresponding to the outer inclined mixing layer ADE, in which content of carbon (C) decreases and content of silver (Ag) increases, is formed in the range of spatter depth over 200 nm up to the first point (a) at which carbon (C) crosses silver (Ag).

In the next, it can be seen that the second point (b), at which carbon (C) crosses silver (Ag) again, appears in the range of spatter depth between 400 nm and 600 nm and a part corresponding to the silver thin film coating layer AD is formed between the second point (b) and the first point (a).

It can be seen that a part corresponding to the inner inclined mixing layer ACD, in which carbon (C) increases and silver (Ag) decreases, is formed near the spatter depth of 600 nm.

It can be seen that a part corresponding to the inner coating layer AC exists in the range of the spatter depth between 700 nm and 1000 nm and further the part over 1000 nm corresponds to the film 8B as a specimen.

Coating was applied on the intermediate rod 4 and butt rod 5 respectively in the manner mentioned above. Then, test was made for evaluating degree of tight adherence of painting.

For test pieces with a layer of outer coating layer AE, test was performed, i) selecting epoxy resin paint for the innermost coating layer AB, ii) selecting acrylurethane resin paint or any of acrylsilicon resin paint, epoxy resin paint and urethane modified acrylsilicon resin paint for the inner coating layer AC, and iii) selecting any of acrylurethane-acrylsilicon resin paint and urethane modified acrylsilicon resin paint for the outer coating layer AE.

As a result of test, the specimen, in which epoxy resin paint is selected for the innermost coating layer AB, urethane modified acrylsilicon resin paint is selected for the inner coating layer AC and urethane modified acrylsilicon resin paint is selected and those are combined for the outer coating layer AE, gave the best result.

Reviewing the test result, it is considered that isocyanate group and epoxy group causes tight adherence with metal silver containing amino group to be raised and brings a favorable effect in water resisting property by selecting urethane modified acrylsilicon resin paint for the outer coating layer AE to be combined.

Further, it is considered that amine in metal silver complex containing amine used for forming the silver thin film coating layer AD remains to exist and reacts with isocyanate group and epoxy group in the inner coating layer AC to give a good bonding strength by employing urethane modified acrylsilicon resin paint for the inner coating layer AC similarly as the outer coating layer AE.

Moreover, while a part of silver deposited in the boundary area between the outer coating layer AE and the silver thin film coating layer AD coexist to form an inclined mixing layer of silver and resin paint, it is considered that this serves to confirm the aforementioned test result.

[Second Embodiment]

The above embodiment has been explained as applied to a fishing rod A. The second embodiment will be explained as applied to a reel, especially to a spinning reel B.

Figure 9:
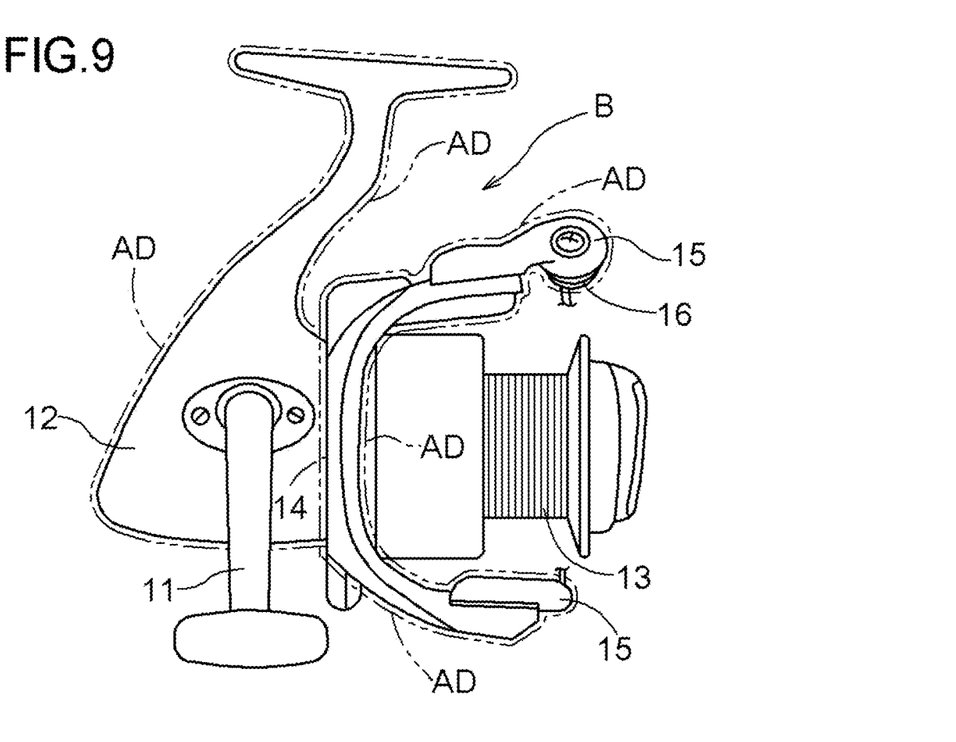
FIG. 9 is a side view showing a spinning reel.

As shown in FIG. 9, a spinning reel B is composed so as to comprise a reel body 12 equipped with a handle 11, a line-winding spool 13 provided so as not to be rotated relative to the reel body 12 and a rotor 14 that is rotated to wind fishing line around the line-winding spool 13. The rotor 14 has, at its tip end, two bail support portions 15 provided opposite to each other with respect to the axis of rotation so as to extend forward respectively. One of the bail support portions 15 has a guide roller 16 attached for guiding fishing line to be wound from the tip side to the line-winding spool 13.

In the composition of the aforementioned spinning reel B, it is efficient to fabricate the reel body 12, the line-winding spool 13, the rotor 14 or the like by use of fiber reinforced resin and apply the coating mentioned in the first embodiment to those parts. Here, as shown in FIG. 2(*a*), the composition can be such that an innermost coating layer AB is provided, an inner coating layer AC is provided on the innermost coating layer AB, a silver thin film coating layer AD is provided on the inner coating layer AC and an outer coating layer AE is provided on the silver thin film coating layer AD. A coating layer made of colored clear paint may be employed for the outer coating layer AE. Further, resin paint may be selected arbitrary.

Otherwise, as shown in FIG. 2(*b*), the composition can be such that an innermost coating layer AB is provided, an inner coating layer AC is provided on the innermost coating layer AB, a silver thin film coating layer AD is provided on the inner coating layer AC, an outer coating layer AE is provided on the silver thin film coating layer AD, a colored clear layer AF is provided on the outer coating layer AE and a transparent clear layer AG is provided on the colored clear layer AF.

Here, in this case, the inner coating layer AC may be coated directly on the surface of the reel body 12 without providing the innermost coating layer AB.

[Third Embodiment]

Figure 10:
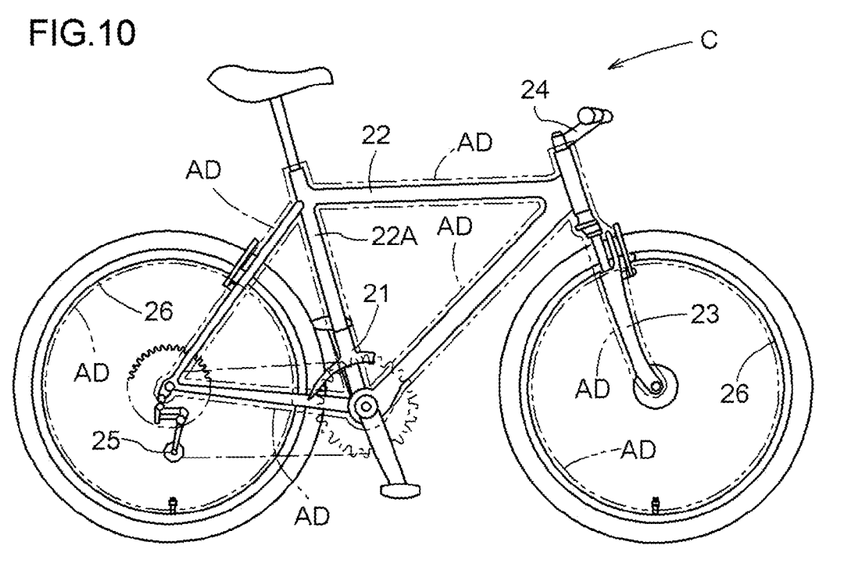
FIG. 10 is a side view showing a bicycle.

Now, an embodiment will be explained in which the aforementioned arrangement of coating is applied to a bicycle C. As shown in FIG. 10, the bicycle C comprises a suspension frame 23 supported by forward and rearward wheels 26, a handle frame 24 secured to the upper portion of the suspension frame 23 and a body frame having the suspension frame 23 or the like connected thereto. A front derailer 21 for a decoration gear box is attached to the seat tube 22A in the middle of the body frame 22 and a rear derailer 25 is attached to the rear end of the body frame 22.

It is effective to form the wheel portion of the front wheel 26 by use of fiber reinforced plastics and apply the coating mentioned in the first embodiment to the wheel portion. That is, as shown in FIG. 2(*a*), (*b*), the composition can be such that an innermost coating layer AB is provided, an inner coating layer AC is provided on the innermost coating layer AB, a silver thin film coating layer AD is provided on the inner coating layer AC and an outer coating layer AE is provided on the silver thin film coating layer AD.

Further, a colored clear layer AF and a transparent clear layer AG may be formed on the outer coating layer AE in an overlapped manner, but it can be arbitrarily selected whether these are formed or not. Moreover, it is also arbitrary what resin paint to select.

A coating composition containing a two-layer composition of a first outer coating layer AE1 and a second outer coating layer AE2 can be employed for the body frame 22 bearing a specially high load as shown in FIG. 2(*c*), and a coating composition containing a one-layer composition of an outer coating layer AE can be employed for the handle frame 24 or the like bearing relatively low load as shown in FIG. 2(*a*).

As mentioned above, a bicycle having less weight can be attained by forming the body frame 22 or the like by use of pipes made of fiber reinforced plastics and a bicycle with a high grade appearance can be provided by improving ornamentation in the aforementioned silver face.

[Fourth Embodiment]

In a case where the object consists particularly in making parts with less weight and improvement of surface ornamentation, the composition may be such that a silver thin film layer AD is applied directly on the surface of a part, and an outer coating layer AE and a transparent clear layer AF are provided or one layer of an outer coating layer AE alone is provided on the silver thin film coating layer AD.

[Another Embodiment]

(1) To say about objects to which mentioned in the First Embodiment is applied, the coating can be applied to a cooler box, a lure, a rod stand, a fishing line guide or the like as fishing tackles.

(2) As coating composition formed on the surface of parts, the innermost coating layer AB may be omitted, applying the inner coating layer AC directly on the surface of parts. Specifically in a case where the object consists in making the tip rod or the like with less weight, the inner coating layer may be provided directly on the surface of a part and only one layer of transparent clear layer as the outermost coating layer may be provided.

(3) The outer coating layer AE may be formed to be of two layers, as shown in FIG. 2(*c*). That is, the outer coating layer can be formed so that the a first outer coating layer AE1 is formed on the silver thin film layer AD and a second outer coating layer AE2 is formed on the first outer coating layer AE1. As resin paint used for the first outer coating layer AE1 and the second outer coating layer AE2, one of the acrylurethane resin paint and the acrylsilicon resin paint used for the outer coating layer AE or both of the acrylurethane resin paint and the acrylsilicon resin paint can be employed.

Here, it is not necessary to use the same resin paint for the first outer coating layer AE1 and the second outer coating layer AE2 but resin paints different each other may be used. Further, the two-layer composition can be employed in a butt rod or the like.

The present invention can be applied not only to parts of fishing tackles but also to parts of a bicycle having parts made of fiber reinforced plastics.

What is claimed is:

1. A surface ornament composition for a part of a fishing tackle comprising an inner coating layer laminated on a surface of a part body made of fiber reinforced plastics, a silver thin film coating layer laminated on the inner coating layer and an outer coating layer laminated on the silver thin film coating layer;

wherein the inner coating layer is formed by use of a resin paint selected as any one of:

(1) an acrylurethane resin paint of two-part formed by urethane reaction of isocyanate group and hydroxyl group, a polyesterurethane resin paint or a polycarbonateurethane resin paint, (2) an acryl silicon resin paint of two-part formed by dehydration-dealcoholation condensation reaction of acryl resin having amino group and silicon compound having epoxy group or urethane modified acrylsilicon resin paint and (3) an urethane modified acrylsilicon resin paint of two-part or three-part in which the urethane reaction and the dehydration-dealcoholation condensation reaction in the above (1) and (2) are simultaneously generated;

wherein the outer coating layer is formed by use of a resin paint selected as either:

(4) an acrylsilicon resin paint of two-part formed by dehydration-dealcoholation condensation reaction of acryl resin having amino group and silicon compound having epoxy group, or (5) an urethane modified acrylsilicon resin paint of two-part or three-part in which urethane reaction of isocyanate group and hydroxyl group is simultaneously generated in addition to the dehydration-dealcoholation condensation reaction of the above (4);

wherein the silver thin film coating layer is formed of metal complex of silver with amine as ligand that is heated after having been applied, wherein the silver thin film coating layer is formed through heating the metal complex of silver to cause nanoparticles of the silver to be deposited and to be partially melt bonded together;

wherein an inner inclined mixing layer in which silver is mixed within the resin paint in the inner coating layer is formed between the silver thin film coating layer and the inner coating layer; and wherein an outer inclined mixing layer in which silver is mixed within the resin paint in the outer coating layer is formed between the silver thin film coating layer and the outer coating layer are formed; and wherein a ratio of the silver mixed within the resin paint is higher as nearer to the silver thin film coating layer in each of the inner inclined mixing layer and the outer inclined mixing layer.

2. The surface ornament composition according to claim 1, wherein a thickness of the silver thin film coating layer is in a range of 0.02 to 0.4 μm.

3. A surface ornament composition for a part of a bicycle comprising an inner coating layer laminated on a surface of a part body made of fiber reinforced plastics, a silver thin film coating layer laminated on the inner coating layer and an outer coating layer laminated on the silver thin film coating layer;

wherein the inner coating layer is formed by use of a resin paint selected as any one of:

(1) an acrylurethane resin paint of two-part formed by urethane reaction of isocyanate group and hydroxyl group, a polyesterurethane resin paint or a polycarbonateurethane resin paint, (2) an acryl silicon resin paint of two-part formed by dehydration-dealcoholation condensation reaction of acryl resin having amino group and silicon compound having epoxy group or urethane modified acrylsilicon resin paint, and (3) an urethane modified acrylsilicon resin paint of two-part or three-part in which the urethane reaction and the dehydration-dealcoholation condensation reaction in the above (1) and (2) are simultaneously generated;

wherein the outer coating layer is formed by use of a resin paint selected as either of:
(4) an acrylsilicon resin paint of two-part formed by dehydration-dealcoholation condensation reaction of acryl resin having amino group and silicon compound having epoxy group, or
(5) an urethane modified acrylsilicon resin paint of two-part or three-part in which urethane reaction of isocyanate group and hydroxyl group is simultaneously generated in addition to the dehydration-dealcoholation condensation reaction of the above (4);
wherein the silver thin film coating layer is formed of metal complex of silver with amine as ligand that is heated after having been applied, wherein the silver thin film coating layer is formed through heating the metal complex of silver to cause nanoparticles of the silver to be deposited and to be partially melt bonded together;
wherein an inner inclined mixing layer in which silver is mixed within the resin paint in the inner coating layer is formed between the silver thin film coating layer and the inner coating layer;
wherein an outer inclined mixing layer in which silver is mixed within the resin paint in the outer coating layer is formed between the silver thin film coating layer and the outer coating layer are formed; and
wherein a ratio of the silver mixed within the resin paint is higher as nearer to the silver thin film coating layer in each of the inner inclined mixing layer and the outer inclined mixing layer.

4. The surface ornament composition according to claim 3, wherein a thickness of the silver thin film coating layer is in a range of 0.02 to 0.4 µm.

* * * * *